3,171,482
METHOD OF INCREASING THE PRODUCTION OF PETROLEUM FROM SUBTERRANEAN FORMATIONS
Clarke N. Simm, Los Angeles, Calif., assignor to California Research Corporation, San Francisco, Calif., a corporation of Delaware
Filed July 31, 1961, Ser. No. 127,990
11 Claims. (Cl. 166—39)

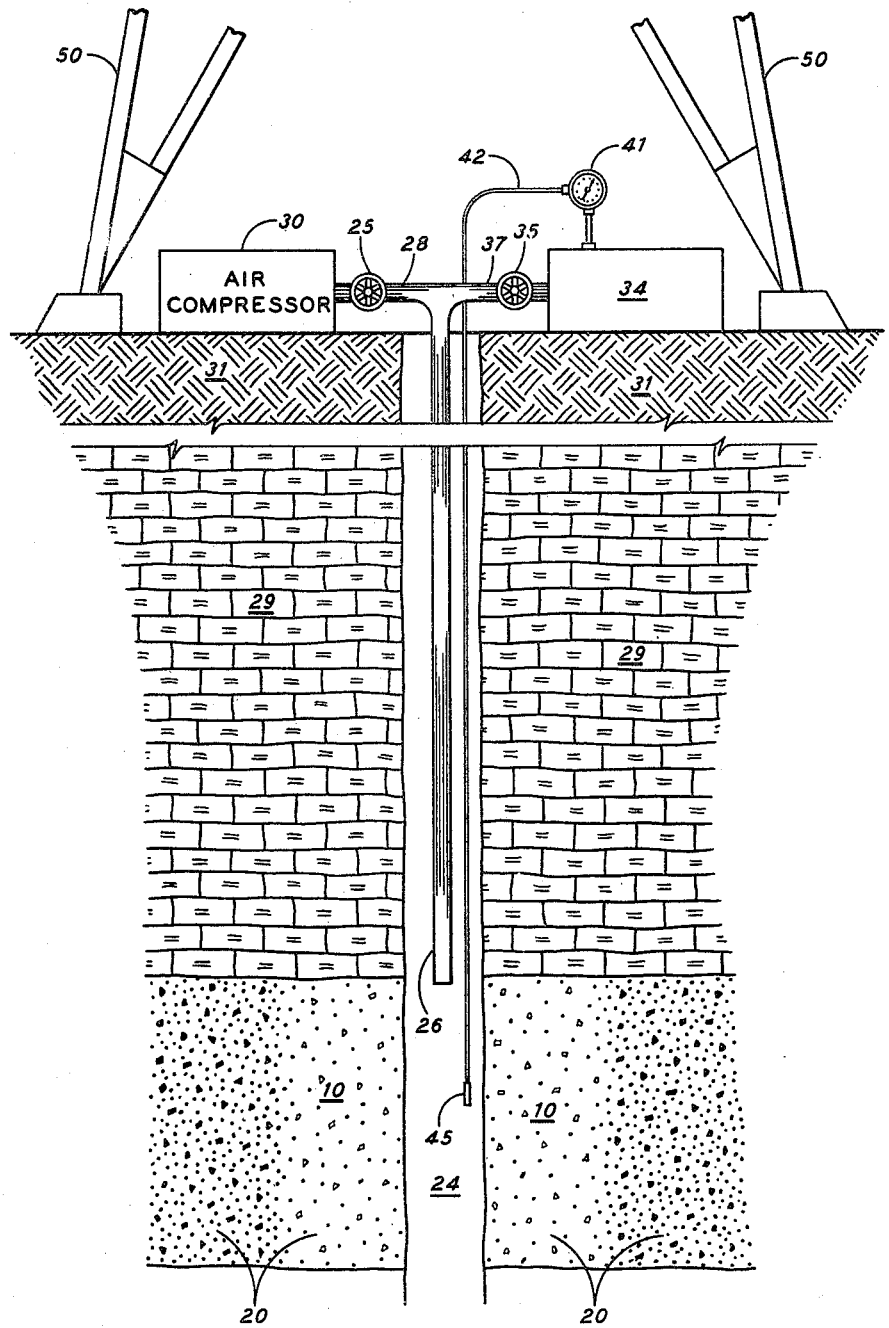

This invention relates in general to the production of petroleum from subterranean formations and relates more specifically to methods for increasing the effective permeability of a formation by generating high temperatures within the formation to thereby improve the production of petroleum therefrom.

In the production of petroleum from subterranean formations, the effective permeability of the producing formation is an important determinant of the production obtainable therefrom. The effective permeability of the formation is affected not only by the original condition of the formation prior to production of petroleum therefrom but also by the deposition of substances in the formation during said production. The deposition of petroliferous substances, particularly waxes and asphalt, in the portion of the formation adjacent to the well during production decreases the effective formation permeability, resulting in an undesired decrease in production. Thus, such obstructing petroliferous deposits can greatly reduce the productivity of a well.

Numerous methods have been proposed heretofore for increasing the effective permeability of subterranean formations as an aid in the production of petroleum therefrom. Among such methods are the use of acidizing solutions to remove obstructing materials in the formation, hydraulic fracturing of the formation to produce fissures therein, the use of a down-hole heater for heating the formations to reduce the viscosity of inflowing petroliferous materials, and combusting hydrocarbons in the well cavity to supply hot gases for reducing the viscosity of the inflowing formation oil. However, none of these methods acts to uniformly decrease the permeability-reducing character of both the natural constitutents of the formation and the deposited petroliferous substances in the formation.

For example, in the above method in which heat from an external source, such as well heater, is introduced into the formation, the temperatures produced in the formation thereby are only in the neighborhood of 150° F. to 350° F., and while such temperatures are sufficient to reduce the viscosity of the petroleum in the formation, such temperatures do not produce complete removal of the petroliferous obstructing deposits, nor do such temperatures have any substantial effect on the natural constitutents of the formation.

In the above method wherein oil in the well cavity is combusted to supply heat to the formation, the viscosity of the inflowing formation oil is reduced. However, it is often found that the temperature of the gases is not high enough to substantially remove the asphaltic and waxy deposits in the portion of the formation immediately surrounding the well, nor to cause substantial improvement in the natural permeability of the formation. The local heating is, however, often enough to cause thermal cracking of the formation oil as it moves into the well. When this occurs the formation is often plugged by the deposition of a heavy residue as the lighter ends of the oil are moved into the well.

Briefly, the present invention contemplates a method for increasing the effective permeability of a section of subterranean formation surrounding a well which section is at least partially obstructed by petroliferous deposits by combusting the oil in the formation a substantial distance out into said formation from said well to elevate the temperature therein to thereby cause substantially complete combustion of the combustible substances in the formation, including the obstructing waxy and asphaltic deposits therein and to produce shrinkage of non-combustible components of the formation, such as bentonitic and other clays, and carbonates. Preferably, the desired temperature is obtained by producing a combustion zone in the portion of the formation adjacent the well by igniting a portion of the petroliferous material in the formation and supplying thereto a combustion supporting gas. The free oxygen combustion supporting gas is supplied to the formation at a rate calculated to produce a predetermined elevated temperature. After the combustion has proceeded a desired distance into the formation, combustion is extinguished. It is often desirable to provide for cooling the elevated temperature portion of the formation to a temperature level below which substantial thermal cracking of the formation oil occurs before again producing the well. Since the method of the invention provides for carrying the high temperature of the combustion zone beyond the well back into the formation, the obstructing petroliferous deposits are removed, and shrinkage of noncombustible components of the formation occurs. This results in a considerable increase in the effective permeability of that portion of the formation around the well which usually controls the productivity of the well. This method will be found to reestablish petroleum productivity where no other practical well stimulation process is particularly effective.

It is a major object of this invention to provide a method for increasing the effective permeability of a subterranean petroliferous-containing formation penetrated by a well which formation has obstructing waxy and/or asphaltic deposits in the section near said well by causing high-temperature combustion of a petroliferous material including said obstructing deposits to a predetermined distance out into said formation from said well to remove substantially completely said deposits and to produce shrinkage of the noncombustible components of the formation and then to provide for cooling said formation adjacent said well prior to returning said improved permeability well to production.

It is an additional object of this invention to provide a method for increasing the effective permeability of the section of a subterranean formation surrounding a well, said formation having substantial carbonate content by producing in said formation section a combustion zone to provide a temperature in said formation of at least 1500° F. for a predetermined time, whereby the petroleum production from said well is increased.

In one aspect the well stimulation method of this invention provides for producing a combustion zone in the well section immediately surrounding the well and then supplying a free oxygen containing gas; for example air, through the well to the formation at a determinable rate to produce a desired temperature in said combustion zone and to move said combustion zone out a substantial distance into said formation. The temperature of the combustion zone is adjusted to substantially remove obstructing asphaltic and waxy deposits from the combusted vicinity, and further the temperature is adjusted to produce dehydration or shrinkage of the noncombustibles in said formation. Further when desirable, the method of the invention provides for extinguishing combustion and for returning the formation to a desired temperature at which temperature the well may be produced without the danger of losing the improved permeability in the section of formation around said well caused by premature oil entry into the high temperature section which results in thermal cracking of said oil and subsequent coke laydown in said formation section.

Further objects and advantages of the method of the present invention will be apparent from reading the following detailed description in light of the accompanying drawing which is a part of the present specification.

FIG. 1 is a sectional view of an oil-bearing formation penetrated by a well diagrammatically illustrating apparatus with which the method of the present invention is accomplished.

Referring specifically to FIG. 1, a sectional view of an oil bearing formation 20 is shown penetrated by a well 24. The well is provided with a pipe 26 for conducting fluid flow to the vicinity of formation 20. Connected to pipe 26 through pipe 28 and valve 25 is a source of compressed air 30. The source of compressed air 30 is for example an air compressor.

A source 34 of noncombustion supporting fluid which may be fuel gas, nitrogen, hydrogen sulfide or water for example is connected to pipe 26 through valve 35 and pipe 37. The noncombustion supporting fluid is useful to provide for cooling the formation after combustion has been extinguished and before the well is produced.

A thermocouple 45 is shown in well 24 adjacent producing formation 20. The thermocouple is operably connected through line 42 to a temperature gage 41 at the surface. A conventional oil derrick is represented by 50.

FIG. 1 diagrammatically illustrates the producing formation 20 after permeability of the section 10 of formation 20 surrounding well 24 has been improved by the method of the invention. As there shown, well 24 penetrates producing formation 20 and intervening formations 29 and 31. The permeability of section 10 has been improved by moving a combustion front out into the formation from well 24. The temperature of the combustion zone is preferably maintained over about 1500° F. in formations having a substantial carbonate content. When this temperature is maintained in formations of this type, shrinkage of the formation occurs and permeability therein is improved. Further any waxy and asphaltic products present are consumed as the combustion front moves through the formation thus aiding in the permeability increase of the formation.

In one aspect of the invention for increasing the effective permeability of petroliferous-containing subterranean formations, a portion of the petroliferous material in the formation is ignited and combustion maintained therein to produce an elevated temperature in the formation adjacent a well. Ignition of the petroliferous material may be accomplished by suitable means, such as through the use of a suitable fuel-air burner lowered into a well and disposed adjacent the formation to be treated, or through the introduction into the well of suitable chemicals capable of producing a temperature sufficient to cause ignition of a portion of the deposit. One method of ignition with the use of phosphorus is described in my U.S. Patent 2,747,672. In many oil-bearing formations ignition of the formation oil may be accomplished spontaneously by the injection of air of oxygen therein.

After ignition of a portion of the petroliferous material in the formation, oxygen or a free oxygen-containing gas such as air is injected into the formation to maintain combustion therein. Procedures for maintaining and controlling the combustion front are described in my U.S. Patent 2,771,951. The temperature is controllable to a great extent by the injection rate of oxygen. Core experiments are desirably run in the laboratory under simulated formation conditions to obtain information on desirable oxygen injection rates to insure that desirable minimum temperatures are reached in the combustion zone. As the oxygen-containing gas is introduced, the combustion zone will move out into the formation away from the well bore, removing substantially all of the obstructing waxy and/or asphaltic deposits and raising the temperature of the formation to substantially that of the combustion zone. After the combustion has thus proceeded for a predetermined distance, the supply of oxygen or oxygen-containing gas is discontinued to extinguish the combustion. The treated formation will have an increased effective permeability due to formation shrinkage and the removal of the undesirable deposits in the section of the formation surrounding the well.

The distance beyond the well which combustion is permitted to progress depends upon the conditions in the formation. For example, if the percentage of production decrease which the well has undergone since completion is known, an estimate of the distance from the well to which the zone of decreased permeability extends may be obtained from a chart such as that given at page 245 of Physical Principles of Oil Production, M. Muskat, McGraw-Hill, 1949. From such data, suitable thermodynamic calculations may be used to determine the oxygen and fuel requirements to provide advance of the combustion zone through the formation section of damaged permeability.

It is preferred to move the combustion front at least about 5 feet out into the formation from the well since distances less than about 5 feet usually have little effect on the overall permeability increase of the well. This is due primarily to the radial flow characteristics of most producing oil wells. Generally it is not desirable to move the combustion front more than about 50 feet out into most formations since improving the permeability of most formations beyond about 50 feet from the well does not appreciably aid in improving oil flow into the well. This is true because the permeability of the section of formation immediately surrounding the well is much more important in governing oil flow than the relative permeability of the entire formation.

I have found that at a temperature of at least 700° F., combustion of substantially all of the petroliferous substances which produce blocking of the formation, such as waxy and asphaltic deposits, will be accomplished. The temperatures required to produce shrinkage of the noncombustible constituents of the formation will vary over a substantial range in dependence upon the nature of such constituents. For example, a temperature slightly in excess of 600° F. is sufficient to substantially shrink most clays, such as are found as constituents in subterranean formations. However, a temperature in excess of 1500° F. is required to produce any substantial shrinkage in formations having substantial carbonate content. The shrinkage of noncombustible portions of the formation will result in a permanent increase in permeability.

The following table sets forth the results of laboratory tests utilizing the method of this invention to increase the effective permeability of a number of sample cores taken from subterranean formations containing substantial carbonate content.

*Table I*

| Core Source | Core Nature | Permeability Before (md.) | Temp., ° F. | Permeability After (md.) |
|---|---|---|---|---|
| Kentucky Corniferous. | Dolomite | Less than 0.05. | 1,800 | 6 |
| Do | do | do | 1,800 | 24 |
| Kelly Snyder | do | 13 | 1,500 | 83 |
| Do | do | do | 1,800 | 667 |
| South Ward | Limey sandstone. | 23 | 1,500 | 42 |
| Kentucky Corniferous. | Clayey sandstone. | 245 | 1,500 | 398 |
| Huntington Beach, Calif. | Water-sensitive sandstone. | 120 | 1,500 | 180 |
| Do | do | 60 [1] | 1,500 | [1] 100 |

[1] Permeability to water; all others, permeability to air.

It will be seen from the above table that substantial increases in the permeabilities of all of the sample cores were obtained in these tests, indicative of the increased permeability and consequent increased production obtainable through the use of the method of this invention on actual formations. Although the minimum temperature utilized in the above tests was 1500° F., it will be understood that, as mentioned above, a temperature of 700° F. is sufficient to produce the desired permeability increase in formations having substantial clay content and obstructing petroliferous deposits. However, a temperature above about 1500° F. is preferred when treating formations having a substantial carbonate content. In some instances temperatures in the combustion zone may reach as high as 2500° F.

As indicated above, it is necessary to elevate the temperature of a formation to above about 700° F. to remove waxy and asphaltic deposits therefrom and to above about 1500° F. to shrink the noncombustible constituents of a carbonate containing formation. As disclosed in my U.S. Patent 2,771,951, a temperature of at least 700° F. is required to establish a stable combustion zone in most formations. As a practical matter, then, it is desirable to heat the waxy and asphaltic plugged formations to a temperature of about 1000 to 1200° F. to insure combustion stability as combustion is moved out into the formation as provided by the method of the invention.

Many if not all types of petroleum as produced from a formation are susceptible to some thermal cracking at temperatures above about 400° F. to 500° F. at pressures common in producing wells. Thermal cracking, as is well known in the art, results in the lighter petroleum fractions being essentially distilled off and the heavier fractions remaining substantially in place. The remaining heavier ends generally have an increased viscosity over the original formation petroleum. Further, thermal cracking of petroleum often results in deposition of coke. In either event, when cracking occurs in the section of formation immediately around the well, serious damage to the permeability of the section results. Therefore, the formation petroleum must be prevented from moving into the elevated temperature section immediately surrounding the well. If this is not accomplished and thermal cracking of the petroleum occurs, the permeability of the section is often decreased rather than improved.

To prevent thermal cracking of the petroleum in the section of a formation surrounding a well wherein combustion to improve the permeability has occurred as provided herein, it is vital to dissipate the heat in said section before allowing formation petroleum to enter therein. One method of dissipating heat and simultaneously keeping formation oil out of this elevated temperature section is injecting a noncombustion supporting fluid into the formation through the well immediately after stopping the injection of oxygen-containing gas therein. Various noncombustion supporting fluids suitable for use in the present invention include field gas, nitrogen, hydrogen sulfide and water. Field gas is the name commonly given gas produced in the field. Methane constitutes a substantial proportion of the constituents making up a common field gas.

As illustrated in FIG. 1, a source of noncombustion supporting fluid 34, which may be for example field gas, is connected in communication with the formation through pipe 26, valve 35 and pipe 37. After combustion of the petroleum in the section 10 of formation 20 around well 24 has proceeded at a desired temperature, for example 1500° F., to a predetermined distance into formation 20, the oxygen containing gas supplied thereto is discontinued and combustion is extinguished. If the well is now placed on production, formation petroleum will move into the elevated temperature section 10 around well 24 and thermal cracking and coke lay down will occur. However, the present invention provides for injecting a noncombustion supporting fluid into said formation at a predetermined pressure to prevent the formation petroleum from immediately entering elevated temperature section 10, where the petroleum would thermally crack and cause coke lay down in said section 10.

The minimum pressure for injection of the noncombustion supporting fluid is usually a pressure slightly in excess of the static formation pressure. The injection of the noncombustion supporting fluid is continued until the temperature of the formation immediately surrounding the well is reduced to a value at which the formation oil will not be appreciably thermally cracked. This is usually about 300 to 500° F. The temperature of the formation may be recorded by means of thermocouple 45 and the gas injection continued until a desirable temperature is reached. Obviously, the rate of injection of the noncombustion supporting gas may be varied to increase the rate of heat loss so that the formation is ready for early return to production.

In another aspect it is sometimes desirable to hold the well under a back pressure and allow the heat to slowly dissipate into the formation before producing the well. It often occurs, however, that an undesirably long time must pass before the well may be returned to production if heat dissipation is accomplished in this manner. Heat loss calculations well known in the art are available to calculate the rate of heat loss of the formation in the absence of temperature measuring instruments in the well. Thus the time required for cooling the formation may be calculated.

In carrying out the invention, for example, in a well originally producing at the rate of 100 barrels per day of crude petroleum but presently producing at the rate of 10 barrels per day due to petroliferous, i.e., waxy and/or asphaltic, deposits formed in the formation section near the borehole, production is stopped and combustion is initiated in the formation immediately adjacent the well in a suitable manner as described in my U.S. Patents 2,747,672 and 2,771,951. After a combustion zone is established in the formation immediately adjacent the well, air is injected through the well, such as, for example, at the rates specified in my U.S. Patent 2,771,951, to elevate the temperature of the combustion zone to at least 700° F. and preferably to about 1000° F.

Air injection is continued at a rate to maintain the temperature in the combustion zone and to move the combustion zone outwardly from the well through a substantial portion of the formation containing the obstructing petroliferous deposits. Upon extinguishing the combustion (by discontinuing the air injection) a noncombustion supporting fluid is injected into the formation to dissipate the heat there present and to lower the temperature to about 300° F. and then the well is returned to production. It is found that the production rate is increased, due to the substantially complete removal of the obstructing petroliferous deposits as well as the dehydration of the dehydratable clays and like decomposition of noncombustible portions of the formation. In some instances, this combined effect may re-establish the original productivity of the well, i.e., from the 10-barrel-per-day rate just before the well treatment to the original 100-barrel-per-day rate of the example above.

This application is a continuation-in-part of my copending application, Serial No. 795,355, filed February 25, 1959 which in turn is a continuation-in-part of my application, Serial No. 407,583, filed February 1, 1954, both of which applications are now abandoned.

Having fully described the invention, I claim:

1. The method of improving fluid flow into a well penetrating a petroleum-bearing formation, the section of which surrounding said well has become at least partially obstructed by waxy and asphaltic deposits comprising igniting a portion of the liquid petroleum in at least a localized zone of said formation penetrated by said well, injecting a free oxygen-containing gas through said well into said formation to establish a combustion zone in said formation around said well, adjusting the rate of flow of said oxygen-containing gas to elevate the temperature of said combustion zone to above about 700° F., continuing the injection of said oxygen-containing gas to move said combustion zone out into said formation from said well, discontinuing the injection of said oxygen-containing gas through said well to extinguish combustion in said formation, injecting a non-coke forming, noncombustion supporting fluid into said formation through said well to cool said formation to below a predetermined temperature to prevent thermal cracking of the petroleum in said formation and subsequent lay down of heavy petroleum fractions in the vicinity of said well, holding the injection of said non-coke forming, noncombustion supporting fluid, and producing petroleum through said well.

2. The method of claim 1 where the non-coke forming, noncombustion supporting fluid is field gas.

3. The method of claim 1 where the non-coke forming, noncombustion supporting fluid is water.

4. The method of claim 1 where the non-coke forming noncombustion supporting fluid is hydrogen sulfide.

5. The method of claim 1 where the non-coke forming, noncombustion supporting fluid is nitrogen.

6. The method of claim 1 where the combustion zone is moved between 5 feet and 50 feet out into said formation.

7. The method of claim 1 where said formation is cooled to a temperature below about 500° F. by the injection of noncombustion supporting gas.

8. The method of claim 1 where said formation is cooled to a temperature between about 300° F. to 500° F. by the injection of noncombustion supporting gas.

9. The method of claim 1 where the rate of flow of said oxygen-containing gas is adjusted to elevate the temperature of said combustion zone to above about 1000° F.

10. The method of improving fluid flow into a well penetrating a petroleum-bearing formation having substantial carbonate content, said formation being at least partially blocked by waxy and asphaltic deposits comprising interrupting petroleum production through said well, initiating combustion of the liquid petroleum in said formation surrounding said well, passing a free oxygen-containing gas through said well into said formation to support the combustion therein, adjusting the flow of the injected oxygen-containing gas to a predetermined rate sufficient to increase the temperature of said formation to at least about 1500° F., continuing the injection of oxygen-containing gas to move said combustion zone at least five feet into said formation, discontinuing the injection of said oxygen-containing gas to extinguish combustion in said formation, injecting a non-coke forming, noncombustion supporting fluid through said well into said formation to cool said formation immediately surrounding said well to below about 500° F., and producing petroleum through the increased permeability portion of said formation surrounding said well.

11. The method of increasing the flow of petroleum into a well penetrating a petroleum-bearing formation having substantial carbonate content, said formation at least partially blocked by waxy and asphaltic deposits comprising the steps of injecting a free oxygen-containing gas into said formation at a rate sufficient to cause the liquid petroleum in said formation to spontaneously ignite to establish a combustion zone in said formation, adjusting the flow of said free oxygen-containing gas to a predetermined value to increase the temperature in the vicinity of said combustion zone to at least 1500° F. to cause shrinkage of the petroleum-bearing formation and to substantially combust the waxy and asphaltic deposits blocking said formation, continuing the injection of said free oxygen-containing gas through said well into said formation at said predetermined rate for a predetermined time to cause said combustion zone to expand between 5 and 50 feet out into said formation from said well to shrink said formation and remove said waxy and asphaltic deposits therein, discontinuing the injection of said free oxygen-containing gas to halt said combustion, injecting a non-coke forming, noncombustion supporting fluid into said formation through said well to cool said formation to below a predetermined temperature to prevent thermal cracking of the petroleum in said formation and subsequent lay down of heavy petroleum fractions in the vicinity of said well, halting the injection of said non-coke forming noncombustion supporting fluid, and producing petroleum through said well.

References Cited in the file of this patent
UNITED STATES PATENTS

| | | |
|---|---|---|
| 1,457,479 | Wolcott | June 5, 1923 |
| 2,685,930 | Albaugh | Aug. 10, 1954 |
| 2,796,935 | Bond | June 25, 1957 |
| 2,906,340 | Herzog | Sept. 29, 1959 |
| 3,013,609 | Ten Brink | Dec. 19, 1961 |

UNITED STATES PATENT OFFICE
CERTIFICATE OF CORRECTION

Patent No. 3,171,482                                March 2, 1965

Clarke N. Simm

It is hereby certified that error appears in the above numbered patent requiring correction and that the said Letters Patent should read as corrected below.

Column 3, line 60, for "of", second occurrence, read -- or --; column 7, line 13, for "holding" read -- halting --.

Signed and sealed this 27th day of July 1965.

(SEAL)
Attest:

ERNEST W. SWIDER                               EDWARD J. BRENNER
Attesting Officer                                    Commissioner of Patents